United States Patent
LoPresto et al.

(10) Patent No.: US 10,435,161 B1
(45) Date of Patent: Oct. 8, 2019

(54) SURFACE SENSING FOR DROPLET SIZE DIFFERENTIATION

(71) Applicant: Rosemount Aerospace Inc., Burnsville, MN (US)

(72) Inventors: Vincent R. LoPresto, Eagan, MN (US); Matthew Webb, Lakeville, MN (US)

(73) Assignee: Rosemount Aerospace Inc., Burnsville, MA (US)

( * ) Notice: Subject to any disclaimer, the term of this patent is extended or adjusted under 35 U.S.C. 154(b) by 0 days.

(21) Appl. No.: 15/969,111

(22) Filed: May 2, 2018

(51) Int. Cl.
| | |
|---|---|
| *B64D 15/20* | (2006.01) |
| *G08B 19/02* | (2006.01) |
| *B64C 13/00* | (2006.01) |
| *B64C 27/04* | (2006.01) |
| *B64D 15/22* | (2006.01) |
| *B64D 45/00* | (2006.01) |

(52) U.S. Cl.
CPC ............ *B64D 15/22* (2013.01); *B64D 45/00* (2013.01)

(58) Field of Classification Search
CPC .................................................... B64D 12/22
See application file for complete search history.

(56) References Cited

U.S. PATENT DOCUMENTS

| | | | |
|---|---|---|---|
| 7,370,525 B1* | 5/2008 | Zhao ...................... | B64D 15/20 73/170.17 |
| 7,845,221 B2* | 12/2010 | Severson ............... | G08B 19/02 244/134 F |
| 9,079,669 B2* | 7/2015 | Chen ...................... | B64D 15/20 |
| 9,914,543 B2 | 3/2018 | Meis et al. | |
| 2002/0158768 A1* | 10/2002 | Severson ............... | B64D 15/20 340/581 |
| 2017/0369176 A1 | 12/2017 | LoPresto | |

FOREIGN PATENT DOCUMENTS

| | | |
|---|---|---|
| CN | 104296957 A | 1/2015 |
| CN | 205256681 U | 5/2016 |
| GB | 2547635 A | 8/2017 |
| JP | 2008014880 A | 1/2008 |

* cited by examiner

*Primary Examiner* — Joseph H Feild
*Assistant Examiner* — Pameshanand Mahase
(74) *Attorney, Agent, or Firm* — Kinney & Lange, P.A.

(57) ABSTRACT

Apparatus and associated methods relate to differentiating ice accretion caused by different supercooled water droplets on an airfoil of an aircraft. A sensor having a sensing surface region is mounted at a mounting location of the airfoil such that the sensing surface region is flush with a surrounding adjacent surface of the airfoil. Water particles of sizes less than or equal to a predetermined threshold do not impinge the sensor surface region at the mounting location when the aircraft is in flight. A sensor driver provides an excitation signal to the sensor. A signal detector detects a sensor signal responsive to the provided excitation signal. The sensor signal is indicative of water particles exceeding the predetermined threshold impinging the sensing surface region. In some embodiments, the sensing surface region is mechanically coupled to a resonant cavity. In other embodiments, the sensor is a surface resistance sensor configured to sense surface resistance.

20 Claims, 9 Drawing Sheets

SURFACE SENSING FOR DROPLET SIZE DIFFERENTIATION

BACKGROUND

Figure 1:
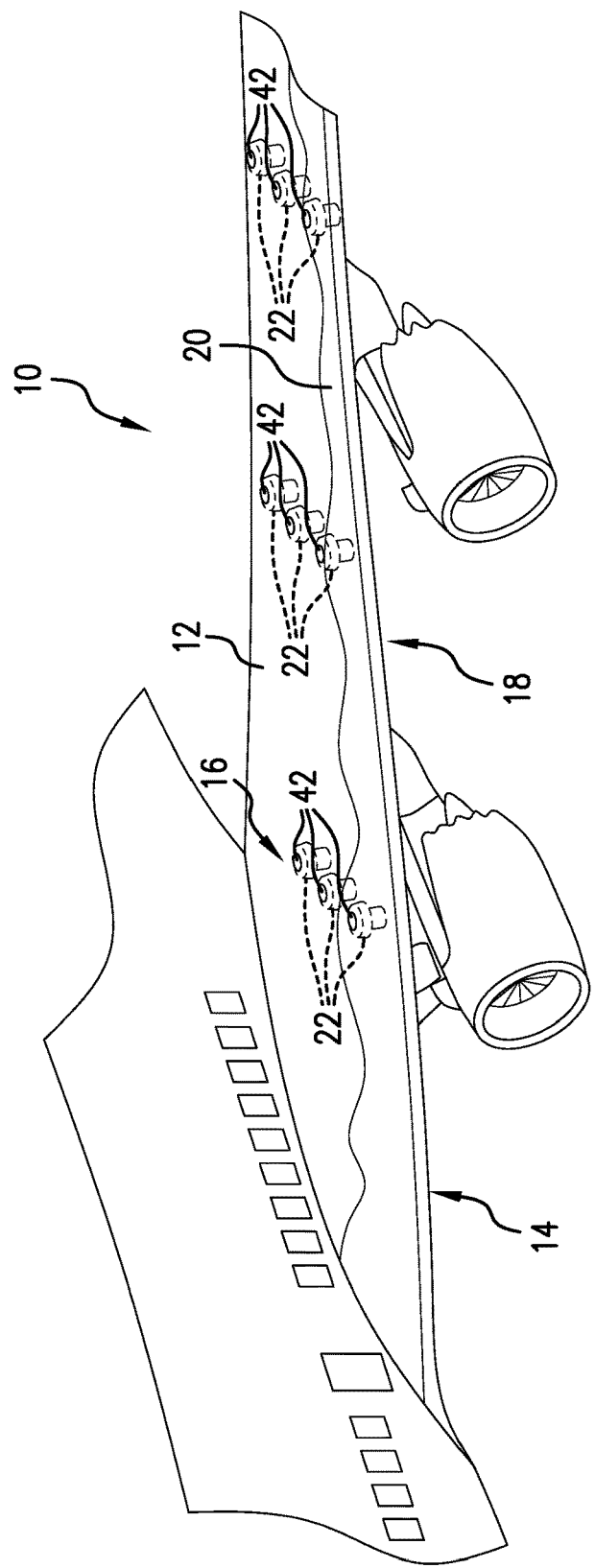

Certain atmospheric conditions can lead to ice formation on aircraft surfaces. Ice formation on aircraft surfaces can increase the weight of the aircraft and can increase the drag of the aircraft. Increasing either the weight or the drag of an aircraft can result in a stall speed that is higher than it would otherwise be in an ice-free condition. Ice formation on lifting surfaces can result in a decrease in a wing's lift and/or a decrease in a propeller's thrust. Ice formation can also affect the controllability of an aircraft by affecting the airflow over control surfaces, such as ailerons.

Various atmospheric conditions can cause more or less ice formation on an aircraft. For example, water droplet density, total moisture content, air temperature, water droplet temperature, droplet size distribution, etc. all factor into risk of ice formation. Some atmospheric conditions can present little or no risk of ice formation on an aircraft.

Various aircraft flying conditions can affect locations and/or amounts of ice formation on aircraft surfaces. For example, airspeed, angle of attack, angle of side-slip, and presence of de-icing equipment all factor into location and/or risk of ice formation. Some aircraft have been equipped with equipment intended to obtain metrics of the atmosphere so as to predict whether the atmosphere presents a risk of ice-formation on exterior surfaces.

SUMMARY

Apparatus and associated methods relate to a system capable of sensing ice accretion on an airfoil of an aircraft. The system includes a sensor having a sensing surface region and configured to be mounted at a mounting location aft of a leading edge of the airfoil such that the sensing surface region is flush with a surrounding adjacent surface of the airfoil. In certain flight conditions, water particles of sizes less than or equal to a predetermined threshold do not impinge the sensor surface region. The system includes a sensor driver coupled to the sensor and configured to provide an excitation signal to the sensor. The system also includes a signal detector configured to detect a sensor signal responsive to the provided excitation signal, the detected sensor signal indicative of water particles of sizes exceeding the predetermined threshold impinging the sensing surface region of the sensor.

Some embodiments relate to a method capable of sensing ice accretion on an airfoil of an aircraft. The method includes presenting a sensor surface region of a sensor at a mounting location aft of a leading edge of the airfoil and flush with a surrounding adjacent surface of the airfoil. In certain flight conditions, water particles of sizes less than or equal to a predetermined threshold do not impinge the sensor surface region. The method includes providing, via a sensor driver coupled to the sensor, an excitation signal to the sensor. The method includes detecting, via a signal detector, a sensor signal responsive to the provided excitation signal. The detected signal is indicative of water particles of sizes exceeding the predetermined threshold impinging the sensing surface region of the sensor.

Some embodiments relate to a system capable of sensing ice accretion on an airfoil of an aircraft. The system includes a sensor having a sensing surface region, one or more processors, and computer-readable memory. The sensor is configured to be mounted at a mounting location aft of a leading edge of the airfoil such that the sensing surface region is flush with a surrounding adjacent surface of the airfoil. In certain flight conditions, water particles of sizes less than or equal to a predetermined threshold do not impinge the sensor surface region. The computer-readable memory is encoded with instructions that, when executed by the one or more processors, cause the system to provide an excitation signal to the sensor and to detect a sensor signal responsive to the provided electrical excitation signal. The detected sensor signal is indicative of water particles of sizes exceeding the predetermined threshold impinging the sensing surface region of the sensor.

BRIEF DESCRIPTION OF THE DRAWINGS

FIG. 1 is a schematic view of an aircraft equipped with an exemplary automated ice accretion detection system.

FIG. 2 is a schematic diagram of ice accreting on a leading edge of a curved member in an airstream.

FIG. 3 is a schematic diagram depicting different zones of ice-accretion associated with different sizes of super-cooled water droplets.

FIG. 4 is a graph of exemplary relations of size of an ice-accretion region versus size of super-cooled water droplets.

FIGS. 5A-5B are perspective and schematic views of an embodiment of an ice-accretion detection system that uses a resonant cavity.

FIG. 6 is a schematic diagram of an aircraft equipped with an automated ice accretion detection system that measures surface conductivity.

FIGS. 7A-7B are perspective and schematic views of an embodiment of an ice-accretion detection system that measures a surface conductivity.

FIG. 8 is a graph depicting a size span of water droplets vs. location along a chord of a convex-shaped housing.

FIG. 9 is a block diagram of an embodiment of an ice accretion detection system and an ice protection system.

DETAILED DESCRIPTION

Apparatus and associated methods relate to differentiating ice accretion caused by different supercooled water droplets on an airfoil of an aircraft. A sensor having a sensing surface region is mounted at a mounting location of the airfoil such that the sensing surface region is flush with a surrounding adjacent surface of the airfoil. Water particles of sizes less than or equal to a predetermined threshold do not impinge the sensor surface region at the mounting location when the aircraft is in flight. A sensor driver provides an excitation signal to the sensor. A signal detector detects a sensor signal responsive to the provided excitation signal. The sensor signal is indicative of water particles exceeding the predetermined threshold impinging the sensing surface region. In some embodiments, the sensing surface region is mechanically coupled to a resonant cavity. In other embodiments, the sensor is a surface resistance sensor configured to sense surface resistance.

FIG. 1 is a schematic view of an aircraft equipped with an exemplary automated ice accretion detection system. In FIG. 1, aircraft 10 has wing 12 that has an ice protection system 14 and an ice accretion detection system 16. Ice protection system 14 is configured to remove ice from a leading edge 18 of wing 12. In some embodiments, ice protection system 14 provides heat to leading edge 18 so as to melt ice accreted thereto. In other embodiments, ice protection system 14 deforms leading edge 18 so as to cause ice to loosen from leading edge 18. Although leading edge 18 of wing 12 is depicted as being ice free, due to the ice removal capability of ice protection system 14, ice accretion 20 is shown aft of ice protection system 14. Ice accretion detection system 16 has sensors 22, which are mounted to wing 12 such that each of sensors 22 has a surface region that is flush with a surrounding adjacent surface of wing 12, thereby exposing the surface region to the atmosphere adjacent to wing 12. Ice accretion detection system 16 generates a signal indicative of ice accretion on surface regions of sensors 22.

Various technologies can be used to detect ice accretion on the exposed surface regions of sensors 22. For example, in some embodiments, a resonant cavity that is defined at least in part by the surface regions can be used to detect ice accretion upon these surface regions. The resonant cavity can have a resonant frequency that is indicative of ice accretion upon the surface region of sensor 22. In some embodiments two adjacent conductors can be located on the surface regions of sensors 22 such that the conductors are exposed to the atmosphere adjacent to wing 12. When water or ice accretes on the surface region and spans two adjacent conductors, the conductivity therebetween can be indicative of such conditions. A temperature sensor located in proximity to the surface sensor can be used to differentiate between detection of water and ice.

As will be described below, if conditions permit, ice preferentially forms at different locations on wing 12. Ice tends to form on leading edge 18 of wing 12 and is less likely to form as the air moves more and more aft of leading edge 18. Ice tends to form increasingly aft of leading edge 18 as the atmosphere contains super-cooled water droplets of increasing size. Locations of sensors 22 can be selected so as to detect ice accretion at such locations. Various aft locations can be so selected so as to determine if the atmosphere contains super-cooled water droplets of corresponding predetermined sizes. Various embodiments may use various testing regions. In some embodiments, testing regions may be located on the fuselage of aircraft 10, for example. In some embodiments, testing regions may be located on an airfoil, such as wing 12 or a tail, of aircraft 10. In some embodiments, testing regions may be located on some appendage of aircraft 10.

In the depicted embodiment, the testing regions include various spanwise locations along wing 12 and at various chordwise locations aft of leading edge 18. These testing regions are monitored by sensors 22 of ice detection system 16. The specific aft locations relative to leading edge 18 can be used to determine a size composition of super-cooled water droplets in the atmosphere adjacent to wing 12. Some such conditions that affect the locations where ice accretes include: aircraft parameters; flying parameters; and atmospheric conditions. A boundary between where ice accretes and where no ice accretes can be calculated based on one or more of these conditions. For example, fluid dynamic computations can be used to calculate the boundary location between ice-free and ice-accretion regions. In some embodiments, a look-up table may be used to determine the indicative aft location, for example.

If ice detection system 16 detects ice accretion at one or more of the aft locations where sensors 22 are mounted, an alert system can generate an alert signal, and/or a control system can control ice protection system 14. In various embodiments, various types of alert signals may be generated. For example, in some embodiments an audible alert signal may be generated. In some embodiments, an alert signal may be in the form of an electrical signal sent to a display device. For example, a display monitor may present an optical image of the testing region along with a flashing alert signal. In some embodiments, an alert signal may be in the form of a signal to another aircraft system. The signal may be provided as either a simple alert or it may be provided with additional information regarding the size of super-cooled water droplets in the atmosphere outside the aircraft.

Figure 2:
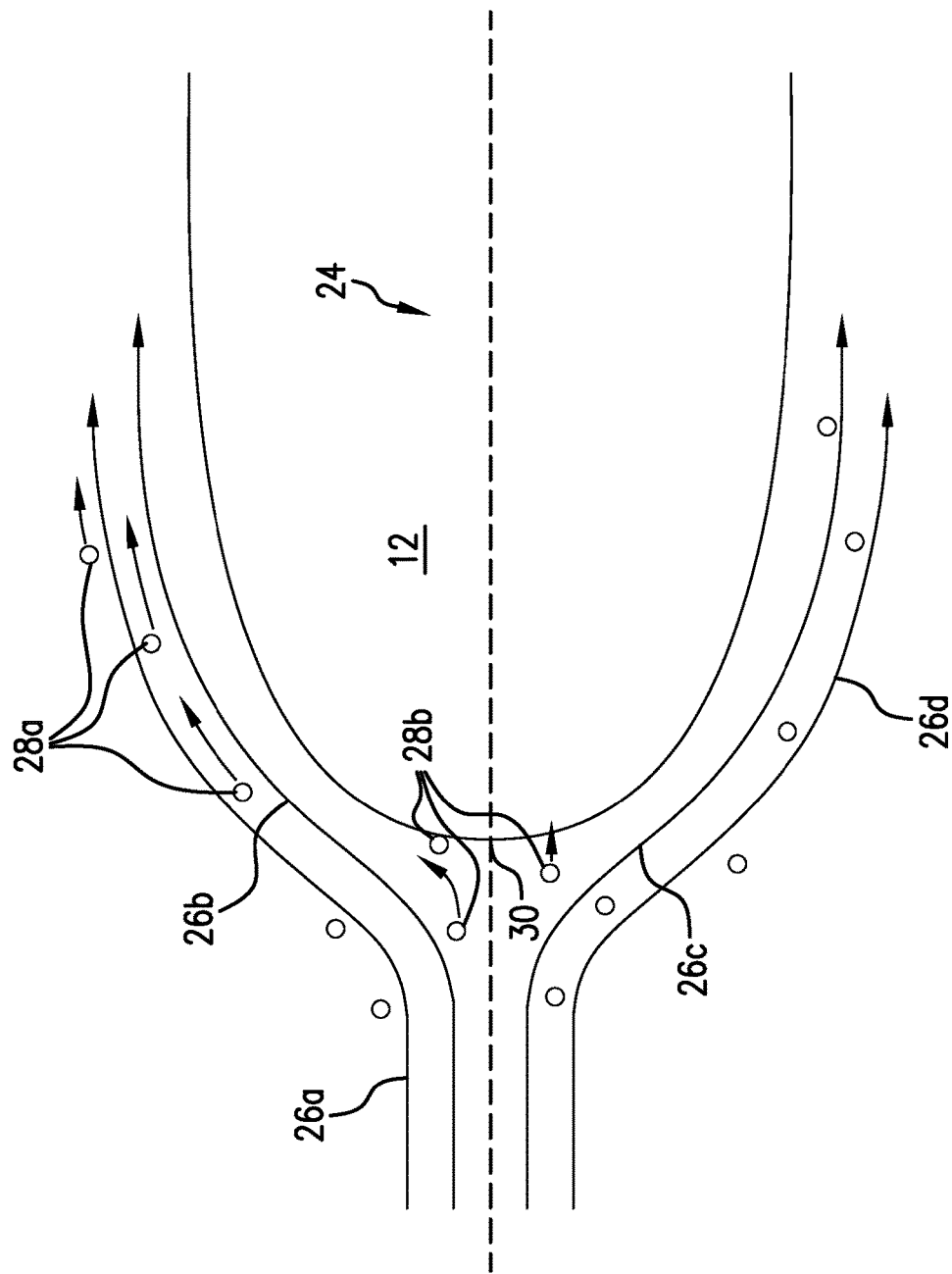

FIG. 2 is a schematic diagram of ice accreting on a leading edge of a curved member in an airstream. In FIG. 2, three-dimensional wing or airfoil 12 is shown in cross section. Airfoil 12 has flow-dividing axis 24 aligned with a general direction of airflow. Airflow is represented by flow vectors 26a, 26b, 26c and 26d. Water droplets 28a, 28b are carried by the airflow. Small water droplets 28a generally follow the flow vectors, because the mass of the small water droplets 28a is small. A momentum of the small water droplets 28a is correspondingly small, because of the small mass. Because the momentum is small for small water droplets, changing the direction, and thus the momentum, of these small water droplets can be achieved by small forces, such as those imparted by flow vectors 26a, 26b, 26c and 26d. Small water droplets 28a impinge airfoil 22 only proximate flow-dividing axis 24 at leading edge 30.

Large water droplets 28b, however, have momentums that are larger than those of small water droplets 28a, due to larger masses of the large water droplets 26b. Such large water droplets 28b do not follow flow vectors 26a, 26b, 26c and 26d as readily as do small water droplets 28a. Because large water droplets 28b more readily cross flow vectors 26a, 26b, 26c, 26d, such large water droplets 28b impinge airfoil 22 along a greater section of leading edge 30 than is impinged by small water droplets 28a. Large water droplets 28b impinge airfoil 22 proximate flow-dividing axis 24 at leading edge 30 as do small water droplets 28a. Large water droplets 28b also impinge airfoil 22 aft of leading edge 30 for a distance that is related to the droplet size. Airflow does impart a force on large water droplets 28b, and therefore large water droplets 28b do experience momentum change. Because large water droplets 28b can undergo such momentum change, these large water droplets impinge airfoil 22 only over a limited range about leading edge 30.

If water droplets 28a, 28b are super-cooled (e.g., at temperatures below a freezing temperature of water), then such particles can freeze upon impact with airfoil 12 or another object (e.g., a fuselage, etc.). Pure water can be super-cooled without freezing in the absence of a nucleation site. Such a scenario is not infrequent in cloud atmospheres. The shock of impingement and/or the structural nucleation sites presented by the impinging object can cause such super-cooled water droplets to freeze almost immediately upon such an impingement event.

Figure 3:
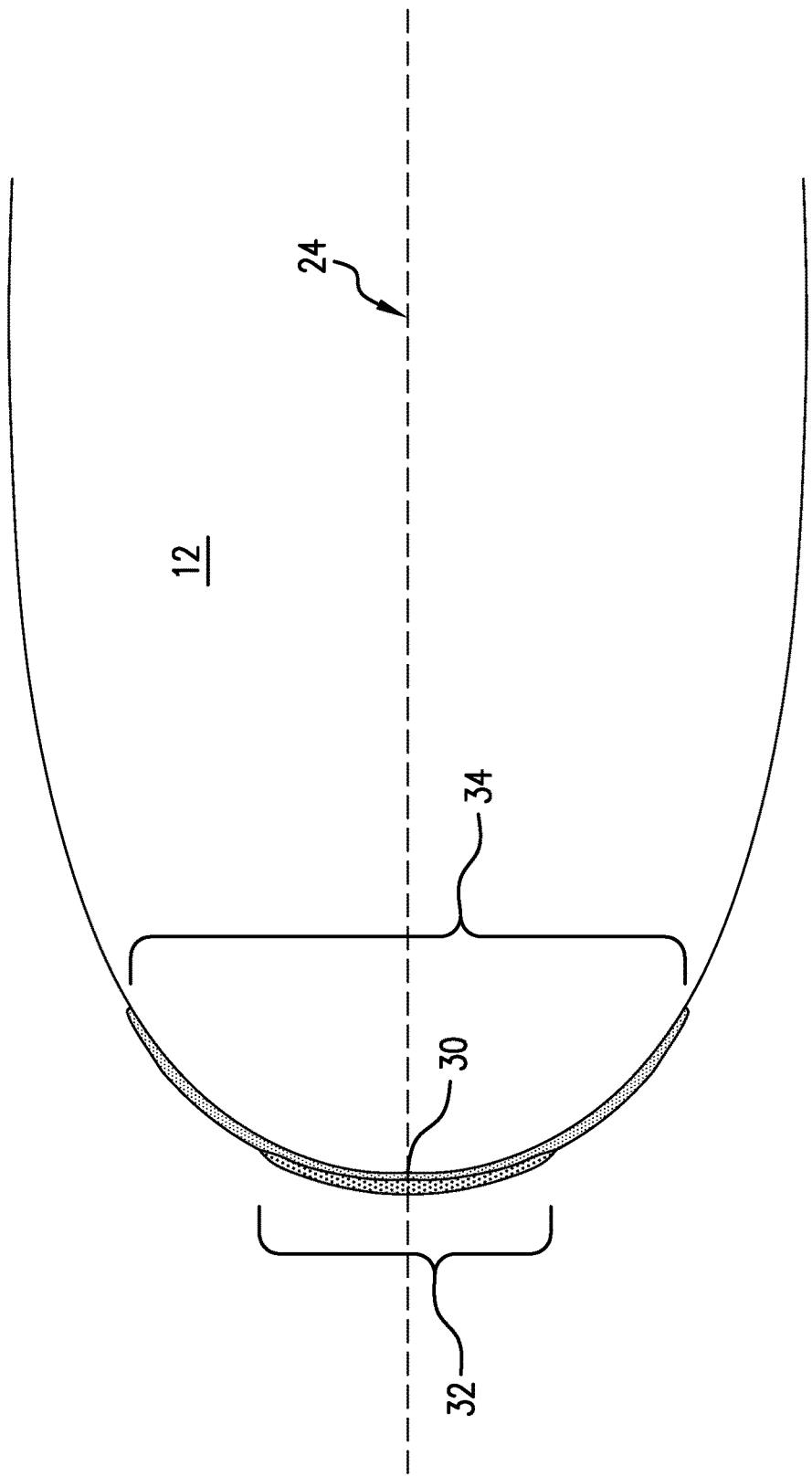

FIG. 3 is a schematic diagram depicting different zones of ice-accretion associated with different sizes of super-cooled water droplets. In FIG. 3, airfoil 12 depicted in FIG. 2 is shown in magnification to demonstrate a relationship between water droplet size and impingement region. Two different impingement regions 32, 34 are depicted proximate leading edge 30 of airfoil 22. Impingement region 32 corresponds to a small region about leading edge 30.

Small impingement region 32 is a region in which water droplets, which are less than or equal to a relatively small size (such as small water droplets 28a depicted in FIG. 2), can impinge, for a given set of aircraft and flying conditions. Small water droplets 28a can readily follow flow vectors 26a, 26b, 26c and 26d (depicted in FIG. 2). Flow vectors 26a and 26b show an airflow pattern above airfoil 22, and flow vectors 26c, 26d show an airflow pattern below airfoil 22.

Flow vectors 26a and 26b diverge from flow vectors 26c and 26d about central axis 24. Only at locations along leading edge 30 that are proximate central axis 24 can small water droplets 28a impinge airfoil 22. The intersection of leading edge 30 and flow-dividing axis 24 can be called the stagnation point.

Large impingement region 34 includes portions of airfoil 12 which can be impinged only by water droplets that are larger than a predetermined size (such as large water droplets 28b depicted in FIG. 2) for a given set of aircraft and flying conditions. Because larger water droplets 28b can cross flow vectors 26a, 26b, 26c and 26d more readily than can small water droplets 28a, such large water droplets 28b impinge airfoil 12 within larger region (e.g., large impingement region 34) about leading edge 30 than the region (e.g., small impingement region 32) impinged by small water droplets 28a. In this way, FIG. 3 demonstrates a relation that exists between a size of water droplets and a regional area in which such sized water droplets are capable of impingement.

Figure 4:
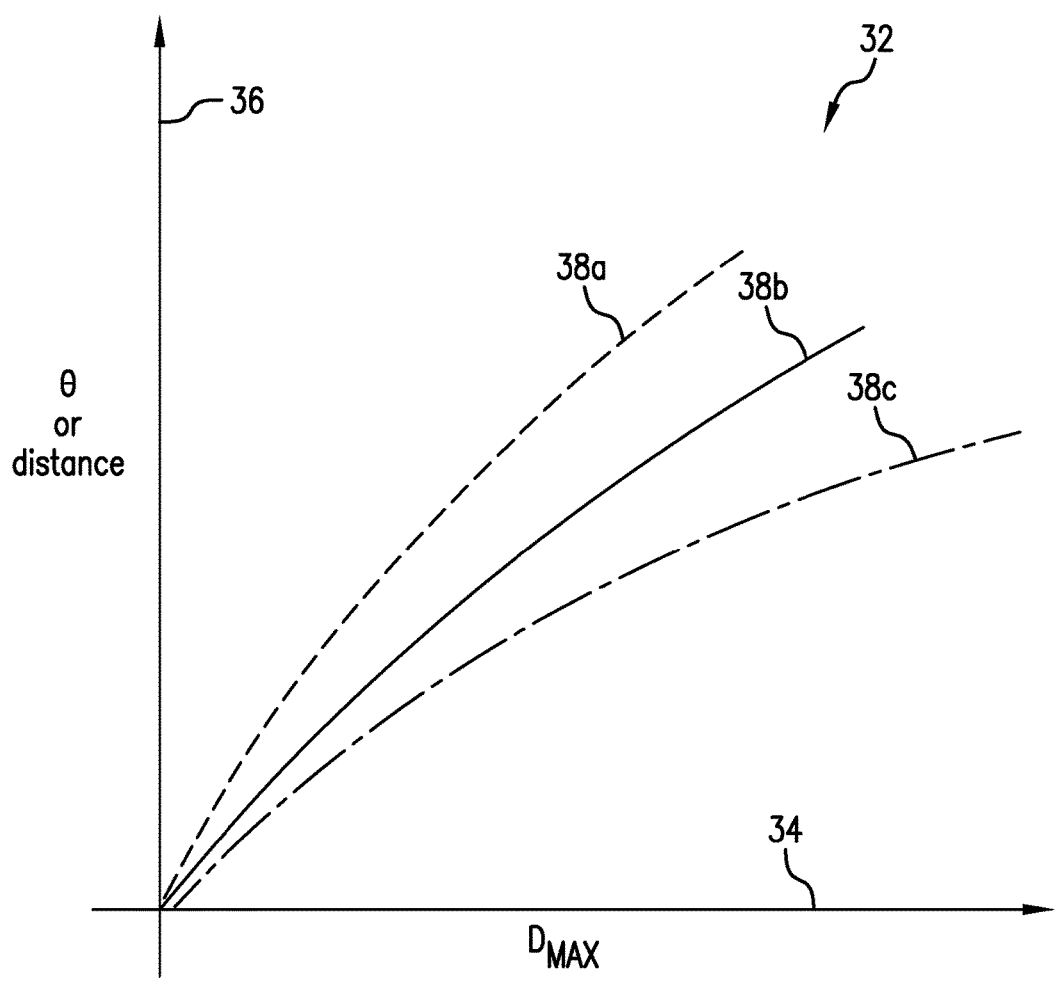

FIG. 4 is a graph of exemplary relations of size of an ice-accretion region versus size of super-cooled water droplets. In FIG. 4, graph 32 has horizontal axis 34 and vertical axis 36. Horizontal axis 34 represents maximum size $D_{MAX}$ of water droplets in an atmosphere. Vertical axis 36 represents a distance dimension (e.g., angle θ from stagnation point or chord length d from the stagnation point) of impingement region. Graph 32 has three relations 38a, 38b and 38c. Relation 38a represents a relation between maximum size $D_{MAX}$ of water droplets and distance dimension of impingement region for a first set of icing conditions. Relations 38b, 38c represent relations between maximum size $D_{MAX}$ of water droplets and distance dimension of impingement region for a second and a third set of icing conditions, respectively.

Parameters that affect icing conditions can include aircraft conditions, flying conditions, and atmospheric conditions, for example. Aircraft conditions can include, for example, a shape of a structure to which water droplets impinge, temperature of a surface of the impingement region, aircraft configuration, etc. Flying conditions can include, for example, an angle of attack, an angle of side-slip, an airspeed, water droplet temperature, liquid water content, etc. Atmospheric conditions can include air temperature, air pressure, etc. Various embodiments may be more or less affected by one or more of the icing conditions. For example, some embodiments may be more or less sensitive to angle of attack. A structure that presents substantially the same shape to the airflow independent of angle of attack, for example, may be not very sensitive to angle of attack. Some geometries may be less sensitive to angle of sideslip, for example.

Figure 5A:
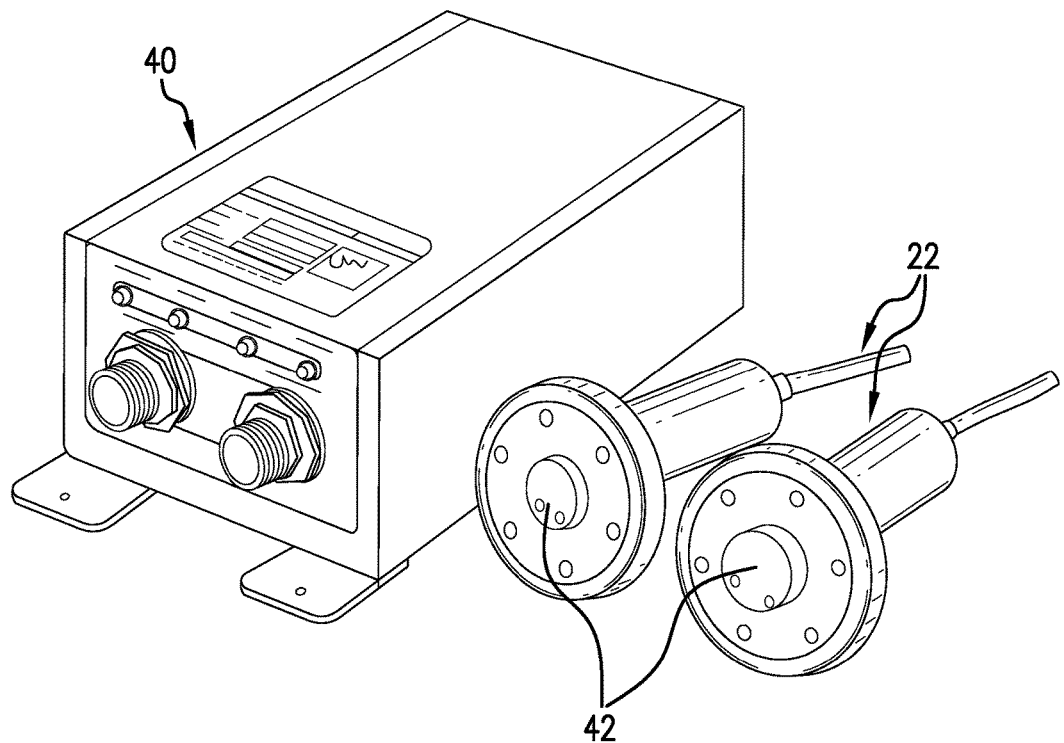
Figure 5B:
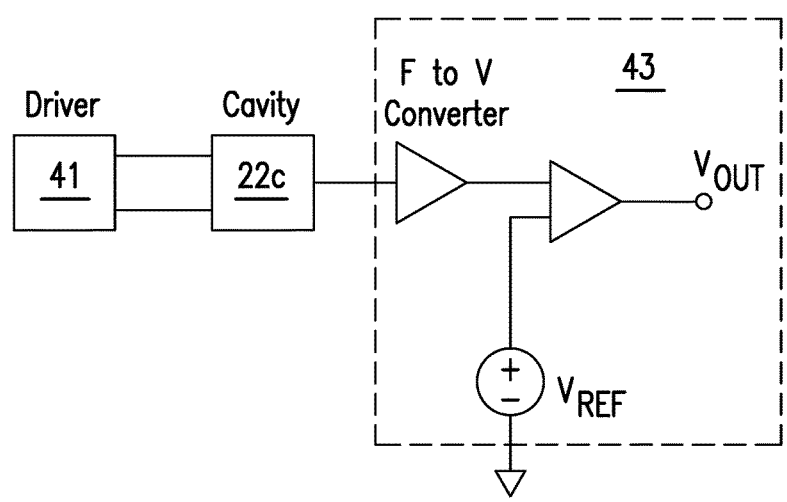

FIGS. 5A-5B are perspective and schematic views of an embodiment of an ice-accretion detection system that uses a resonant cavity. In FIGS. 5A-5B, ice accretion detection system 16 includes sensors 22 and sense circuitry 40. Each of sensors 22 is configured to be mounted to an aircraft wing such that sensing surface region 42 is flush with a surrounding adjacent surface of the aircraft wing 12. Sense circuitry 40 can be mounted inside of the aircraft wing, or in an electronics bay of the aircraft, for example. Sense circuitry 40 can include sensor electrical driver 41 configured to provide an electrical excitation signal to sensors 22. Sense circuitry 40 can also include signal detector 43 configured to detect a signal responsive to the provided electrical excitation signal, the detected signal indicative of ice accretion on the sensing surface region of the sensor. In the depicted embodiment, sensors 22 has resonant cavity 22C that has at least one surface, such as sensing surface region 22, that vibrates in response to a changing electro-magnetic field. Each of sensing surface regions 42 of sensors 22 is an exterior surface of resonant cavity 22C. The signal detected by signal detector 43 is a resonant frequency of resonant cavity 22C. The resonant frequency changes in response to ice accretion on sensing surface region 42.

Figure 6:
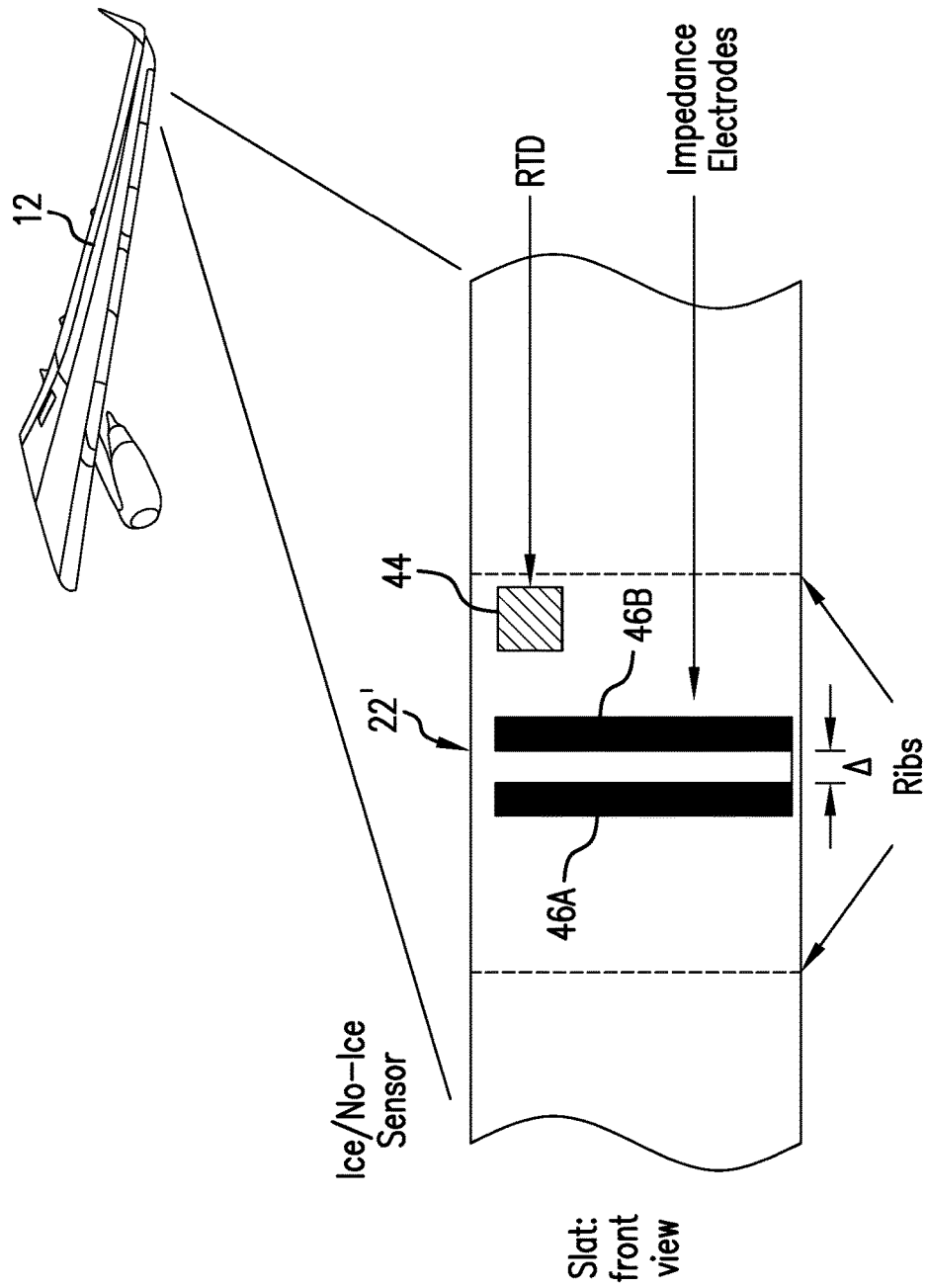

FIG. 6 is a schematic diagram of an aircraft equipped with an automated ice accretion detection system that measures surface conductivity. In FIG. 6, surface conduction sensor 22' and temperature sensor 44 are mounted to wing 12. Surface conduction sensor 22' is configured to measure the surface conductivity of wing 12 at the testing location where surface conduction sensor 22' is mounted. Surface conduction sensor 22' includes first and second exposed conductors 46A and 46B on the sensing surface so as to be exposed to an atmosphere adjacent to the sensing surface. First and second conductors 46A and 46B are configured to sense current flow therebetween. Ice accretion on the sensing surface and spanning separation distance Δ between first and second exposed conductors 46A and 46B facilitates current flow therebetween. Thus, the measured conduction, or equivalently the measured resistance, between exposed conductors 46A and 46B is indicative of ice accretion on the surface region.

Figure 7A:
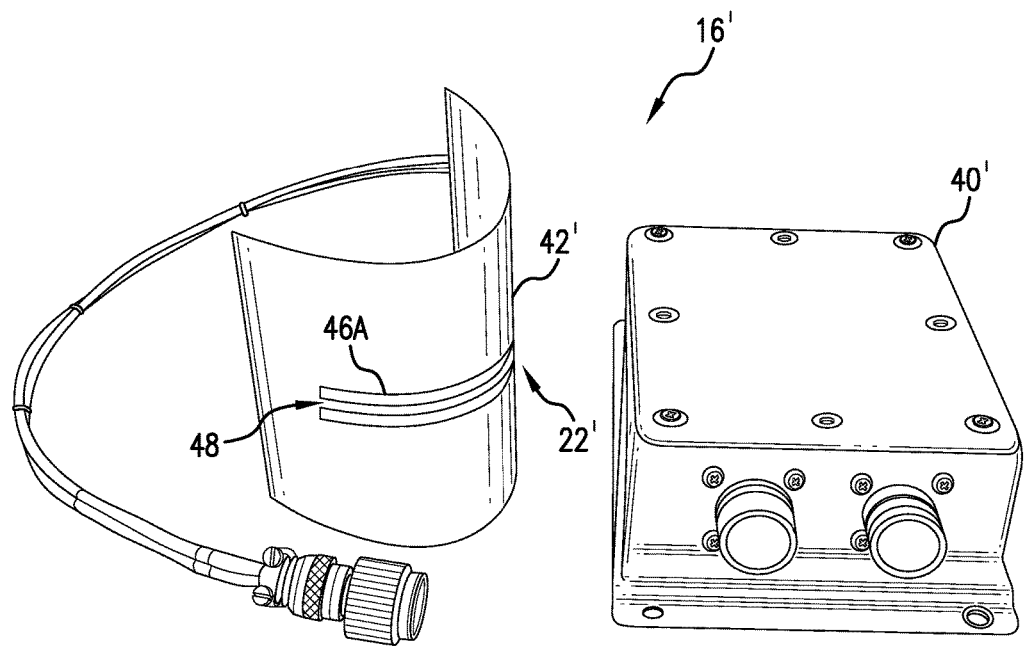
Figure 7B:
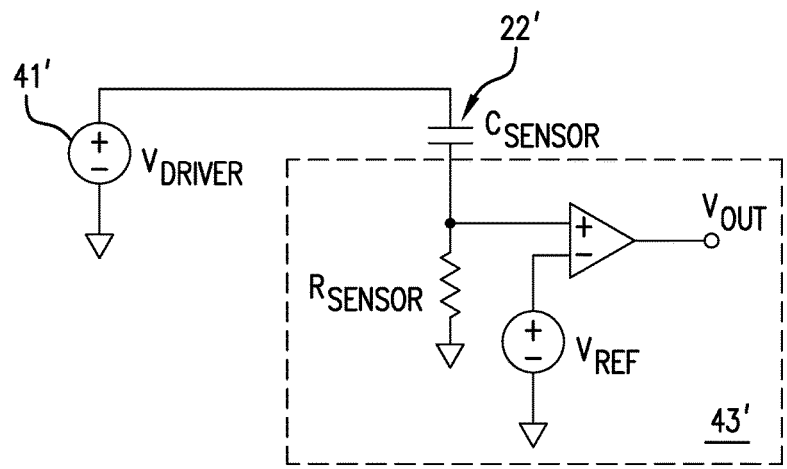

FIGS. 7A-7B are perspective and schematic views of an embodiment of an ice-accretion detection system that measures a surface conductivity. In FIGS. 7A-7B, ice accretion detection system 16' includes sensor 22' and sense circuitry 40'. Sensor 22' sensor is configured to be mounted to an airfoil of an aircraft such that sensing surface region 42' is flush with or flat upon a surrounding adjacent surface of the airfoil. Sense circuitry 40' can be mounted inside of the aircraft wing, or in an electronics bay of the aircraft, for example. Sense circuitry 40' can include sensor electrical driver 41' configured to provide an electrical excitation signal, such as a voltage or current, to sensor 22'. Sense circuitry 40' can also include signal detector 43' configured to detect a signal responsive to the provided electrical excitation signal, the detected signal indicative of ice accretion on sensing surface region 42' of sensor 22'. In the depicted embodiment, sensor 22' has first and second conductors 46A and 46B. First and second conductors 46A and 46B are configured to sense current flow therebetween. First and second conductors 46A and 46B are separated from one another via insulative region 48 therebetween.

Figure 8:
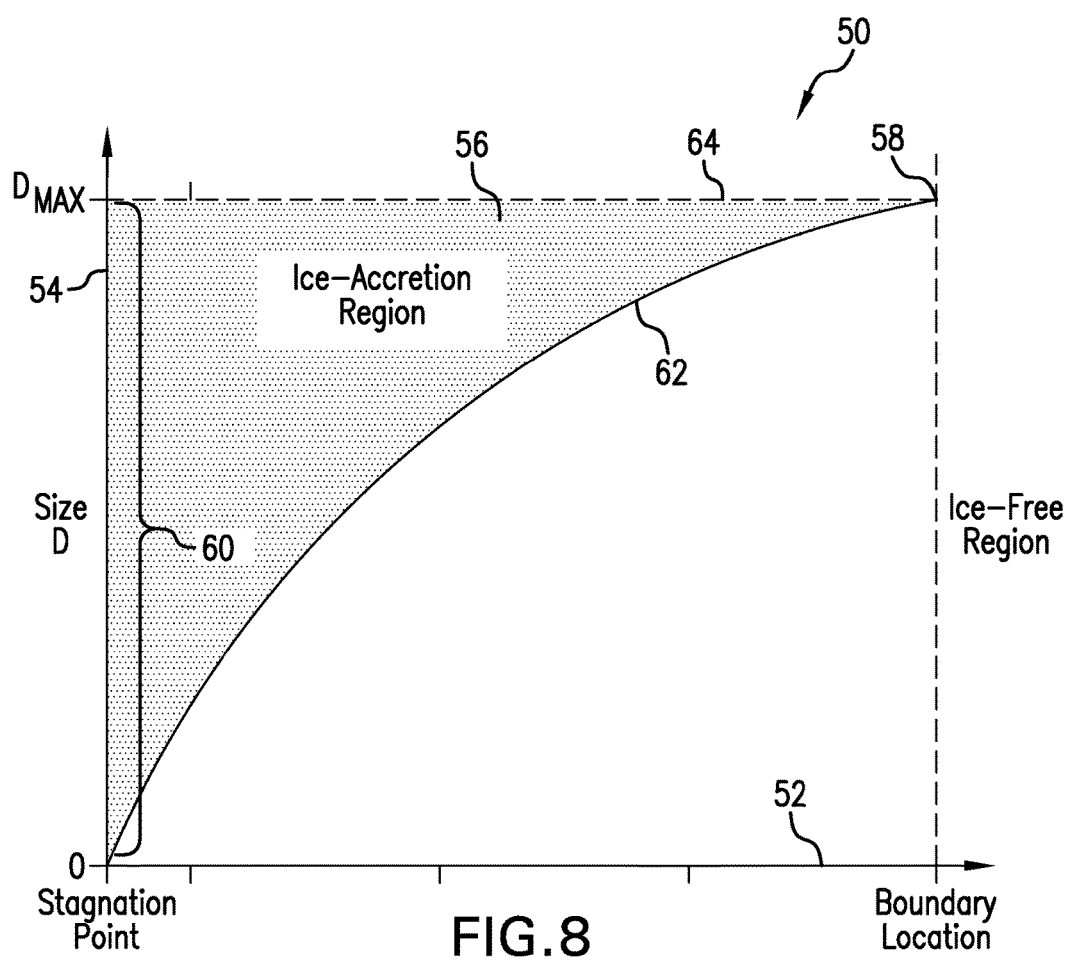

FIG. 8 is a graph depicting a size span of water droplets vs. location along a chord of a convex-shaped housing. In FIG. 8, graph 50 has horizontal axis 52 and vertical axis 54. Horizontal axis 52 represents location along a chord of a convex exterior surface exposed to an atmosphere containing super-cooled water droplets. Vertical axis 54 represents a size of the super-cooled water droplets. Graph 50 includes droplet size/location relation 56 corresponding to a size of super-cooled droplets that can strike the convex exterior surface at the indicated location. For example, at a given location along the convex-shaped housing (e.g., draw a vertical line from any x-axis location), the exterior surface of the convex-shaped housing will be impinged by droplets exceeding some minimum size up until the maximum sized droplet contained in the cloud atmosphere. Line 62 identifies the relation corresponding to the predetermined minimum size of super-cooled water droplets that contribute to ice accretion vs. location along the chord of the convex shaped housing. Droplets smaller than the minimum size will follow the airflow vectors and will not impinge the convex-shaped housing except at locations near the stagnation point.

Dashed line 64 identifies the maximum size of super-cooled water droplets contained in the cloud atmosphere.

For a given size of a super-cooled water droplet (e.g., draw a horizontal line from any y-axis location), the exterior surface of the convex-shaped housing will be impinged for the stagnation point up to a maximum impingement location corresponding to the given size of super-cooled water droplet. Point 58 of relation 56 corresponds to the boundary location separating an ice accretion portion and an ice-free portion of the convex exterior surface for the cloud atmosphere having the maximum size of super-cooled water droplet corresponding to dashed line 64. Not all sizes of particles, however, contribute to ice accretion at every location within the ice accretion portion of the convex exterior surface. At point 58, relation 56 indicates that only super-cooled water droplets equal to the maximum size (or greater if the cloud atmosphere had greater sized particles) accrete at the boundary location. The region to the right of point 58 on graph 50 corresponds to the ice-free portion of the convex exterior surface, and points to the left of point 58 correspond to the ice-accretion portion of the convex exterior surface.

Vertical line 60 of relation 56 corresponds to the stagnation point of the convex exterior surface. At the stagnation point corresponding to vertical line 60, super-cooled water droplets of all sizes within the atmosphere contribute to ice accretion. Between point 58 and vertical line 60, super-cooled water droplets that have a size greater than a predetermined minimum will contribute to ice accretion. Super-cooled water droplets smaller than the predetermined minimum size will follow the flow vector lines and not impinge the convex exterior surface and therefore will not contribute to ice accretion. Line 62 identifies the relation corresponding to the predetermined minimum size of super-cooled water droplets that contribute to ice accretion vs. location along the chord of the convex shaped housing.

Figure 9:
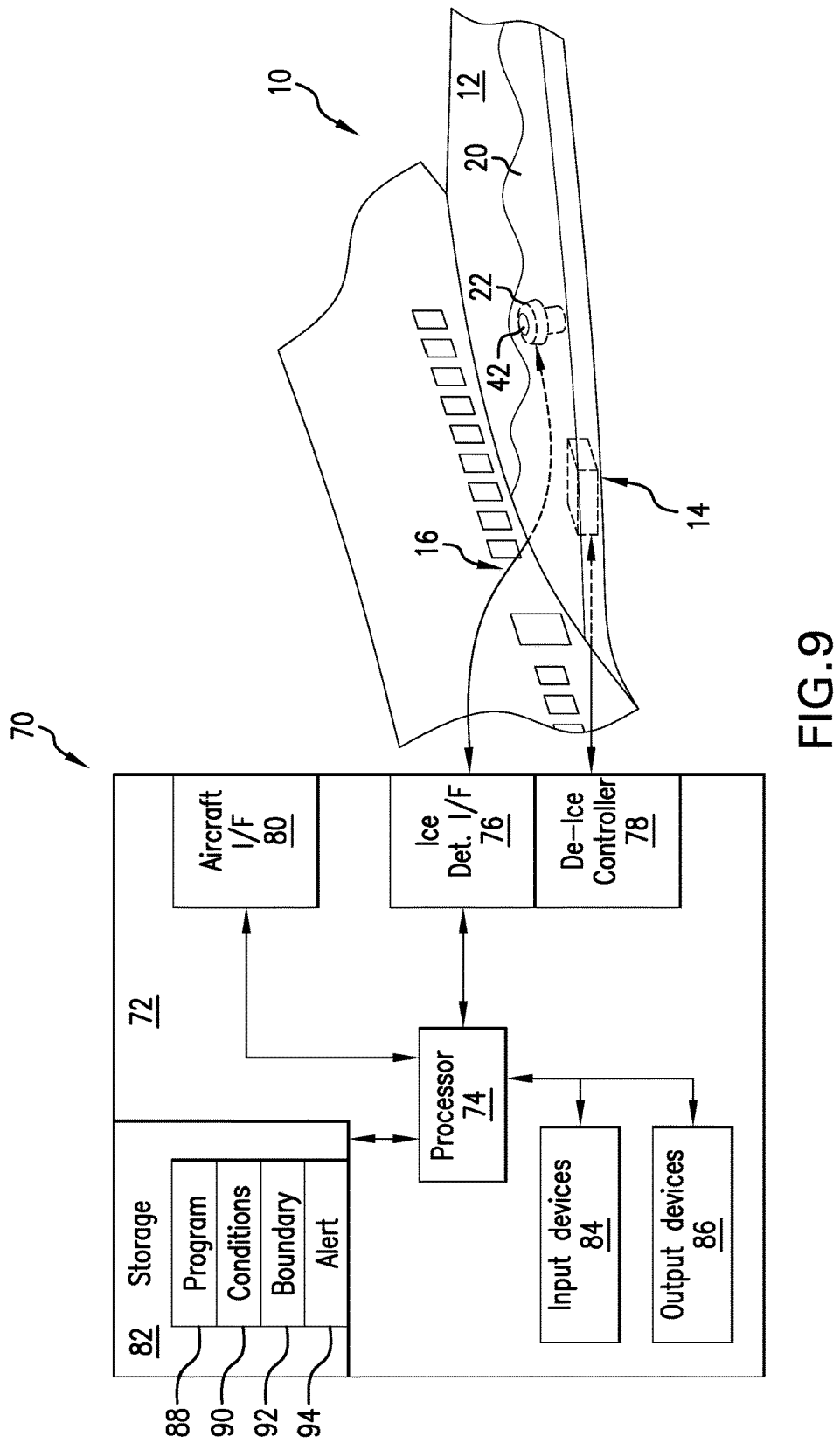

FIG. 9 is a block diagram of an exemplary ice-accretion-detection/ice-protection system 70. In FIG. 9, ice-accretion-detection/ice-protection system 70 includes controller 72, sensor 22, and ice protection system 14 mounted to airfoil 12 of aircraft 10. Controller 72 includes processor(s) 74, ice detection interface 76, ice protection interface 78, aircraft interface 80, storage device(s) 82, user input devices 84, and user output devices 86. Storage device(s) 82 has various storage or memory locations. Storage device(s) 82 includes program memory 88, conditions data memory 90, boundary calculation module 92, and alert module 94. Controller 72 is in communication with ice detection system 16. Ice detection system 16 is configured to monitor ice accretion on sensor surface region 42 (depicted in FIG. 5). Sensor surface region 42 is depicted with ice-accretion 20 formed thereon.

As illustrated in FIG. 5, controller 72 includes processor(s) 74, ice detection interface 76, ice protection interface 78, aircraft interface 80, storage device(s) 82, user input devices 84, and user output devices 86. However, in certain examples, controller 72 can include more or fewer components. For instance, in examples where controller 72 is an avionics unit, controller 72 may not include user input devices 84 and/or user output devices 86. In some examples, such as where controller 72 is a mobile or portable device such as a laptop computer, controller 72 may include additional components such as a battery that provides power to components of controller 72 during operation.

Processor(s) 74, in one example, is configured to implement functionality and/or process instructions for execution within controller 72. For instance, processor(s) 74 can be capable of processing instructions stored in storage device(s) 82. Examples of processor(s) 74 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 82 can be configured to store information within controller 72 during operation. Storage device(s) 82, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 82 is a temporary memory, meaning that a primary purpose of storage device(s) 82 is not long-term storage. Storage device(s) 82, in some examples, is described as volatile memory, meaning that storage device(s) 82 do not maintain stored contents when power to controller 72 is turned off. Examples of volatile memories can include random access memories (RAM), dynamic random access memories (DRAM), static random access memories (SRAM), and other forms of volatile memories. In some examples, storage device(s) 82 is used to store program instructions for execution by processor(s) 74. Storage device(s) 82, in one example, is used by software or applications running on controller 72 (e.g., ice formation calculation) to temporarily store information during program execution.

Storage device(s) 82, in some examples, also include one or more computer-readable storage media. Storage device(s) 82 can be configured to store larger amounts of information than volatile memory. Storage device(s) 82 can further be configured for long-term storage of information. In some examples, storage device(s) 82 include non-volatile storage elements. Examples of such non-volatile storage elements can include magnetic hard discs, optical discs, flash memories, or forms of electrically programmable memories (EPROM) or electrically erasable and programmable (EEPROM) memories.

Ice detection interface 76, in some examples, includes a communications module. Ice detection interface 76, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB).

Ice protection interface 78, in some examples, includes a communications module. Ice protection interface 78, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB).

Aircraft interface 80 can be used to communicate information between controller 72 and an aircraft. In some embodiments, such information can include aircraft conditions, flying conditions, and/or atmospheric conditions. In some embodiments, such information can include data processed by controller 72, such as, for example, alert signals. Aircraft interface 80 can also include a communications module. Aircraft interface 80, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User input devices 84, in some examples, are configured to receive input from a user. Examples of user input devices 84 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

User output devices 86 can be configured to provide output to a user. Examples of user output devices 86 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Discussion of Possible Embodiments

The following are non-exclusive descriptions of possible embodiments of the present invention.

Apparatus and associated methods relate to a system capable of sensing ice accretion on an airfoil of an aircraft. The system includes a sensor having a sensing surface region and configured to be mounted at a mounting location aft of a leading edge of the airfoil such that the sensing surface region is flush with a surrounding adjacent surface of the airfoil. In certain flight conditions, water droplets of sizes less than or equal to a predetermined threshold do not impinge the sensor surface region. The system includes a sensor driver coupled to the sensor and configured to provide an excitation signal to the sensor. The system also includes a signal detector configured to detect a sensor signal responsive to the provided excitation signal, the detected sensor signal indicative of water particles of sizes exceeding the predetermined threshold impinging the sensing surface region of the sensor.

The system of the preceding paragraph can optionally include, additionally and/or alternatively, any one or more of the following features, configurations and/or additional components:

A further embodiment of the foregoing system can further include a resonant cavity. The sensing surface region of the sensor can be an exterior surface of the resonant cavity. The signal detected by the signal detector can be a resonant frequency of the resonant cavity. The resonant frequency can change in response to water on the sensing surface region.

A further embodiment of any of the foregoing systems can further include an alert generator configured to generate an alert signal in response to the detected signal indicative of water particles of a size exceeding the predetermined threshold impinging the sensor surface region of the sensor.

A further embodiment of any of the foregoing systems, wherein the sensor is a surface resistance sensor having first and second exposed conductors on the sensing surface region so as to be exposed to an atmosphere adjacent to the sensing surface region.

A further embodiment of any of the foregoing systems, wherein the surface resistor sensor can include first and second exposed conductors on the sensing surface so as to be exposed to an atmosphere adjacent to the sensing surface.

A further embodiment of any of the foregoing systems, wherein the first and second conductors can be configured to sense current flow therebetween, wherein ice accretion on the sensing surface and spanning a separation distance between the first and second exposed conductors facilitates current flow therebetween.

A further embodiment of any of the foregoing systems can further include an icing protection system.

A further embodiment of any of the foregoing systems, wherein the sensor can be configured to be mounted aft of an icing protection system.

A further embodiment of any of the foregoing systems can further include a controller configured to control the icing protection system in response to the detected signal indicative of ice accretion.

A further embodiment of any of the foregoing systems, wherein the sensor can be a first sensor, the sensing surface region can be a first sensing surface region, the mounting location can be a first mounting location, the surrounding adjacent surface can be a first surrounding adjacent surface, the predetermined threshold can be a first predetermined threshold, the excitation signal can be a first excitation signal and the sensor signal can be a first sensor signal. The system can further include a second sensor having a second sensing surface region and configured to be mounted at a second mounting location aft of the first mounting location such that the second sensing surface region is flush with a second surrounding adjacent surface of the airfoil. In certain flight conditions, water particles less than or equal to a second predetermined threshold greater than the first predetermined threshold do not impinge the second sensor surface region at the second mounting location.

The sensor driver can be coupled to the second sensor and further configured to provide a second excitation signal to the second sensor. The signal detector can be further configured to detect a second sensor signal responsive to the provided second excitation signal, the detected sensor signal indicative of water particles of a size exceeding the second predetermined threshold impinging the second sensing surface region of the sensor.

A further embodiment of any of the foregoing systems can further include a particle size analyzer configured to generate a water particle size histogram based on the first and second sensor signals.

Some embodiments relate to a method capable of sensing ice accretion on an airfoil of an aircraft. The method includes presenting surface region of a sensor aft of a leading edge of the airfoil and flush with a surrounding adjacent surface of the airfoil. In certain flight conditions, water particles of sizes less than or equal to a predetermined threshold do not impinge the sensor surface region. The method includes providing, via a sensor driver coupled to the sensor, an excitation signal to the sensor. The method includes detecting, via a signal detector, a sensor signal responsive to the provided excitation signal. The detected signal is indicative of water particles of sizes exceeding the predetermined threshold impinging the sensing surface region of the sensor.

The method of the preceding paragraph can optionally include, additionally and/or alternatively, any one or more of the following features, configurations and/or additional components:

A further embodiment of the foregoing method can further include generating, via an alert generator, an alert signal in response to the detected sensor signal exceeding a predetermined threshold indicative of a predetermined measure of ice accretion.

A further embodiment of any of the foregoing methods can further include controlling, via a controller, an icing protection system in response to the detected sensor signal indicative of ice accretion.

A further embodiment of any of the foregoing methods, wherein detecting a sensor signal responsive to the provided excitation signal can include detecting a resonant frequency of the resonant cavity.

A further embodiment of any of the foregoing methods, wherein detecting a sensor signal responsive to the provided excitation signal can include sensing current flow between first and second conductors of a surface resistance sensor.

Some embodiments relate to a system for sensing ice accretion on an airfoil of an aircraft. The system includes a sensor having a sensing surface region, one or more processors, and computer-readable memory. The sensor is configured to be mounted at a mounting location aft of a leading edge of the airfoil such that the sensing surface region is flush with a surrounding adjacent surface of the airfoil. In certain flight conditions, water particles of sizes less than or equal to a predetermined threshold do not impinge the sensor surface region at the mounting location. The computer-readable memory is encoded with instructions that, when executed by the one or more processors, cause the system to provide an excitation signal to the sensor and to detect a sensor signal responsive to the provided electrical excitation signal. The detected sensor signal is indicative of water particles of sizes exceeding the predetermined threshold impinging the sensing surface region of the sensor.

A further embodiment of the foregoing system, wherein the computer-readable memory can be further encoded with instructions that, when executed by the one or more processors, cause the system to generate an alert signal in response to the detected signal exceeding the predetermined threshold indicative of water particles of sizes exceeding the predetermined threshold impinging the sensor surface region of the sensor.

A further embodiment of any of the foregoing systems can further include further comprising an icing protection system.

A further embodiment of any of the foregoing systems, wherein the computer-readable memory can be further encoded with instructions that, when executed by the one or more processors, cause the system to control the icing protection system in response to the detected sensor signal indicative of water particles of sizes exceeding the predetermined threshold impinging the sensor surface region of the sensor.

A further embodiment of any of the foregoing systems, wherein the sensor can be a resonant cavity. The sensing surface region of the sensor can be an exterior surface of the resonant cavity. The signal detected by the signal detector can be a resonant frequency of the resonant cavity. The resonant frequency can change in response to ice accretion on the sensing surface region.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system capable of sensing ice accretion on an airfoil of an aircraft, the system comprising:
   a sensor having a sensing surface region, the sensor configured to be mounted at a mounting location aft of a leading edge of the airfoil such that the sensing surface region is flush with a surrounding adjacent surface of the airfoil, wherein, in certain flight conditions, water droplets of sizes less than or equal to a predetermined threshold do not impinge the sensor surface region;
   a sensor driver coupled to the sensor and configured to provide an excitation signal to the sensor; and
   a signal detector configured to detect a sensor signal responsive to the provided excitation signal, the detected sensor signal indicative of water particles of sizes exceeding the predetermined threshold impinging the sensing surface region of the sensor.

2. The system of claim 1, wherein the sensor comprises:
   a resonant cavity,
   wherein the sensing surface region of the sensor is an exterior surface of the resonant cavity,
   wherein the signal detected by the signal detector is a resonant frequency of the resonant cavity, the resonant frequency changing in response to water on the sensing surface region.

3. The system of claim 1, further comprising:
   an alert generator configured to generate an alert signal in response to the detected signal indicative of water particles of a size exceeding the predetermined threshold impinging the sensor surface region of the sensor.

4. The system of claim 1, wherein the sensor comprises:
   a surface resistance sensor having first and second exposed conductors on the sensing surface region so as to be exposed to an atmosphere adjacent to the sensing surface.

5. The system of claim 4, wherein the first and second conductors are configured to sense current flow therebetween, wherein ice accretion on the sensing surface and spanning a separation distance between the first and second exposed conductors facilitates current flow therebetween.

6. The system of claim 1, further comprising an icing protection system.

7. The system of claim 6, wherein the sensor is configured to be mounted aft of an icing protection system.

8. The system of claim 6, further comprising:
a controller configured to control the icing protection system in response to the detected signal indicative of ice accretion.

9. The system of claim 1, wherein the sensor is a first sensor, the sensing surface region is a first sensing surface region, the mounting location is a first mounting location, the surrounding adjacent surface is a first surrounding adjacent surface, the predetermined threshold is a first predetermined threshold, the excitation signal is a first excitation signal and the sensor signal is a first sensor signal, the system further comprising:
a second sensor having a second sensing surface region, the second sensor configured to be mounted at a second mounting location aft of the first mounting location such that the second sensing surface region is flush with a second surrounding adjacent surface of the airfoil, wherein, in certain flight conditions, water particles less than or equal to a second predetermined threshold greater than the first predetermined threshold do not impinge the second sensor surface region at the second mounting location,
wherein the sensor driver is coupled to the second sensor and further configured to provide a second excitation signal to the second sensor,
wherein the signal detector is further configured to detect a second sensor signal responsive to the provided second excitation signal, the detected sensor signal indicative of water particles of a size exceeding the second predetermined threshold impinging the second sensing surface region of the sensor.

10. The system of claim 9, further comprising:
a particle size analyzer configured to generate a water particle size histogram based on the first and second sensor signals.

11. A method capable of sensing ice accretion on an airfoil of an aircraft, the method comprising:
presenting a sensing surface region of a sensor aft of a leading edge of the airfoil and flush with a surrounding adjacent surface of the airfoil, wherein, in certain flight conditions, water particles of sizes less than or equal to a predetermined threshold do not impinge the sensor surface region;
providing, via a sensor driver coupled to the sensor, an excitation signal to the sensor; and
detecting, via a signal detector, a sensor signal responsive to the provided excitation signal, the detected signal indicative of water particles of sizes exceeding the predetermined threshold impinging the sensing surface region of the sensor.

12. The method of claim 11, further comprising:
generating, via an alert generator, an alert signal in response to the detected sensor signal exceeding a predetermined threshold indicative of a predetermined measure of ice accretion.

13. The method of claim 11, further comprising:
controlling, via a controller, an icing protection system in response to the detected sensor signal indicative of ice accretion.

14. The method of claim 11, wherein detecting a sensor signal responsive to the provided excitation signal includes:
detecting a resonant frequency of the resonant cavity.

15. The method of claim 11, wherein detecting a sensor signal responsive to the provided excitation signal includes:
sensing current flow between first and second conductors of a surface resistance sensor.

16. A system capable of sensing ice accretion on an airfoil of an aircraft, the system comprising:
a sensor having a sensing surface region, the sensor configured to be mounted at a mounting location aft of a leading edge of the airfoil such that the sensing surface region is flush with a surrounding adjacent surface of the airfoil, wherein, in certain flight conditions, water particles of sizes less than or equal to a predetermined threshold do not impinge the sensor surface region;
one or more processors; and
computer-readable memory encoded with instructions that, when executed by the one or more processors, cause the system to:
provide an excitation signal to the sensor; and
detect a sensor signal responsive to the provided electrical excitation signal, the detected sensor signal indicative of water particles of sizes exceeding the predetermined threshold impinging the sensing surface region of the sensor.

17. The system of claim 16, wherein the computer-readable memory is further encoded with instructions that, when executed by the one or more processors, cause the system to:
generate an alert signal in response to the detected signal exceeding the predetermined threshold indicative of water particles of sizes exceeding the predetermined threshold impinging the sensor surface region of the sensor.

18. The system of claim 16, further comprising an icing protection system.

19. The system of claim 18, wherein the computer-readable memory is further encoded with instructions that, when executed by the one or more processors, cause the system to:
control the icing protection system in response to the detected sensor signal indicative of water particles of sizes exceeding the predetermined threshold impinging the sensor surface region of the sensor.

20. The system of claim 16, wherein the wherein the sensor comprises:
a resonant cavity,
wherein the sensing surface region of the sensor is an exterior surface of the resonant cavity,
wherein the signal detected by the signal detector is a resonant frequency of the resonant cavity, the resonant frequency changing in response to water on the sensing surface region.

* * * * *